(12) United States Patent
Liu et al.

(10) Patent No.: US 10,754,173 B2
(45) Date of Patent: Aug. 25, 2020

(54) DISPLAY DEVICE

(71) Applicant: CHAMP VISION DISPLAY INC., Miaoli County (TW)

(72) Inventors: Chin-Ku Liu, Miaoli County (TW); Jhong-Hao Wu, Miaoli County (TW); Fa-Chih Liu, Miaoli County (TW)

(73) Assignee: CHAMP VISION DISPLAY INC., Miaoli County (TW)

( * ) Notice: Subject to any disclaimer, the term of this patent is extended or adjusted under 35 U.S.C. 154(b) by 0 days.

(21) Appl. No.: 16/423,200

(22) Filed: May 28, 2019

(65) Prior Publication Data

US 2019/0369408 A1  Dec. 5, 2019

(30) Foreign Application Priority Data

May 29, 2018 (CN) .......................... 2018 1 0529832

(51) Int. Cl.
  *G02B 30/56* (2020.01)
  *F21V 8/00* (2006.01)
  *H05K 5/00* (2006.01)

(52) U.S. Cl.
  CPC ........... *G02B 30/56* (2020.01); *G02B 6/0043* (2013.01); *G02B 6/0055* (2013.01); *G02B 6/0088* (2013.01); *H05K 5/0017* (2013.01)

(58) Field of Classification Search
  CPC .... G02B 30/56; G02B 6/0043; G02B 6/0055; G02B 6/0088; H05K 5/0017
  See application file for complete search history.

(56) References Cited

U.S. PATENT DOCUMENTS

| | | | |
|---|---|---|---|
| 10,048,560 B1 * | 8/2018 | Mazuir | .................... G02F 1/137 |
| 2006/0232724 A1 * | 10/2006 | Hsieh | .................. G02F 1/13362 349/64 |
| 2009/0316075 A1 * | 12/2009 | Bae | ........................ G02F 1/1333 349/65 |

(Continued)

FOREIGN PATENT DOCUMENTS

| | | |
|---|---|---|
| JP | P2004-354751 A | 12/2004 |
| JP | P2005-34283 A | 2/2005 |
| TW | I294544 B | 3/2008 |

(Continued)

OTHER PUBLICATIONS

Machine translation of JP 2005034283 (Year: 2005).*
Machine translation of JP 2004354751 (Year: 2004).*

*Primary Examiner* — Leah Simone Macchiarolo

(57) ABSTRACT

The invention provides a display device including a panel module, a reflection module and a light guide module. The panel module has a display area for displaying an image and a perspective area for displaying a background. The reflection module is disposed at a side of the panel module. A reflective sheet on the reflection module faces the panel module. The shape and position of the reflective sheet correspond to the shape and position of the display area, respectively. The light guide module includes a light guide plate and a light source. The light guide module is disposed between the panel module and the reflection module. The light guide plate has a plurality of optical microstructures, and light emitted by the light source is at least partially directed away from the panel module by the optical microstructures and is transmitted to the reflection module.

18 Claims, 6 Drawing Sheets

(56) References Cited

U.S. PATENT DOCUMENTS

2009/0316082 A1* 12/2009 Bae ...................... G02B 6/0063
                                                                349/74
2015/0226988 A1*  8/2015 Chen ................. G02F 1/134309
                                                                349/12

FOREIGN PATENT DOCUMENTS

| TW | 201531777 A | 8/2015 |
| TW | I521269 B | 2/2016 |

* cited by examiner

DISPLAY DEVICE

CROSS-REFERENCE TO RELATED APPLICATION

This application claims the priority benefit of China application 201810529832.0, filed on 2018 May 29. The entirety of the above-mentioned patent application is hereby incorporated by reference herein and made a part of this specification.

FIELD OF THE INVENTION

The invention relates to a display device, and more particularly to a display device capable of configuring images to have stereoscopic or floating visual effects.

BACKGROUND OF THE INVENTION

With the advancement of technology, the development of visual effects in planar presentation has become saturated. What comes next is the desire and pursuit of stereoscopic presentation closer to the real world.

At present, a three-dimensional floating image is mainly generated by a projection device integrated with a chip, a magnet, a light emitting diode and a propeller blade. The three-dimensional floating projection image is projected by rotation of the propeller blade. However, the rotation shaft of the propeller blade is opaque, thereby affecting the effect of the floating image. And since the floating image is generated with rotating red, green and blue light-emitting diodes, it is easy to see an image of color separation, low resolution and poor quality.

At present, there is another transparent display using a polymer dispersed liquid crystal (PDLC). The PDLC can be electrically controlled such that the display image exhibits a full or partial transparent or matte state. However, the PDLC not only is high in unit price, but also causes the light transmittance of the transparent display to decrease. In addition, the image displayed by the transparent display also tends to overlap and interact with the background image, resulting in clutter in the image at the overlap.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device, in which an image displayed by a display area is not affected by a background, and the image of the display area has a visual effect of floating on a background image.

Other advantages and objects of the invention may be further illustrated by the technical features broadly embodied and described as follows.

In order to achieve one or a portion of or all of the objects or other objects, the display device provided by the invention includes a panel module, a reflection module and a light guide module. The panel module has at least one display area and at least one perspective area. The at least one display area is for displaying an image. The at least one perspective area is for displaying a background. The reflection module includes a first transparent substrate and at least one reflective sheet disposed at the first transparent substrate. The reflection module is disposed at one side of the panel module. The at least one reflective sheet faces the panel module. The shape and position of the at least one reflective sheet correspond to the shape and position of the at least one display area, respectively. The at least one perspective area corresponds to an area other than the at least one reflective sheet in the reflection module. The light guide module includes a light guide plate and at least one light source. The light guide module is disposed between the panel module and the reflection module. The light guide plate includes at least one light incident surface, a first surface and a second surface. The first surface is opposite to the second surface, and the at least one light incident surface is connected to the first surface and the second surface. The first surface faces the panel module. The second surface faces the reflection module. The at least one light source is disposed beside the at least one light incident surface, respectively. The light guide plate has a plurality of optical microstructures. Light emitted from the at least one light source is, through the optical microstructures, at least partially directed away from the panel module and is transmitted to the reflection module.

The invention adopts the light guide module disposed between the panel module and the reflection module. The light emitted by the light source is at least partially directed away from the panel module by the optical microstructures of the light guide plate and is transmitted to the reflection module. And the shape and position of the reflective sheet disposed at the reflection module correspond to the shape and position of the display area of the panel module. Therefore, the light from the light guide plate can be reflected by the reflective sheet to the display area as a backlight source. Meanwhile, a portion of the background image is shielded by the reflective sheet, so that the image displayed in the display area is not affected by the background, and the image of the display area has a visual effect of floating on the background image.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
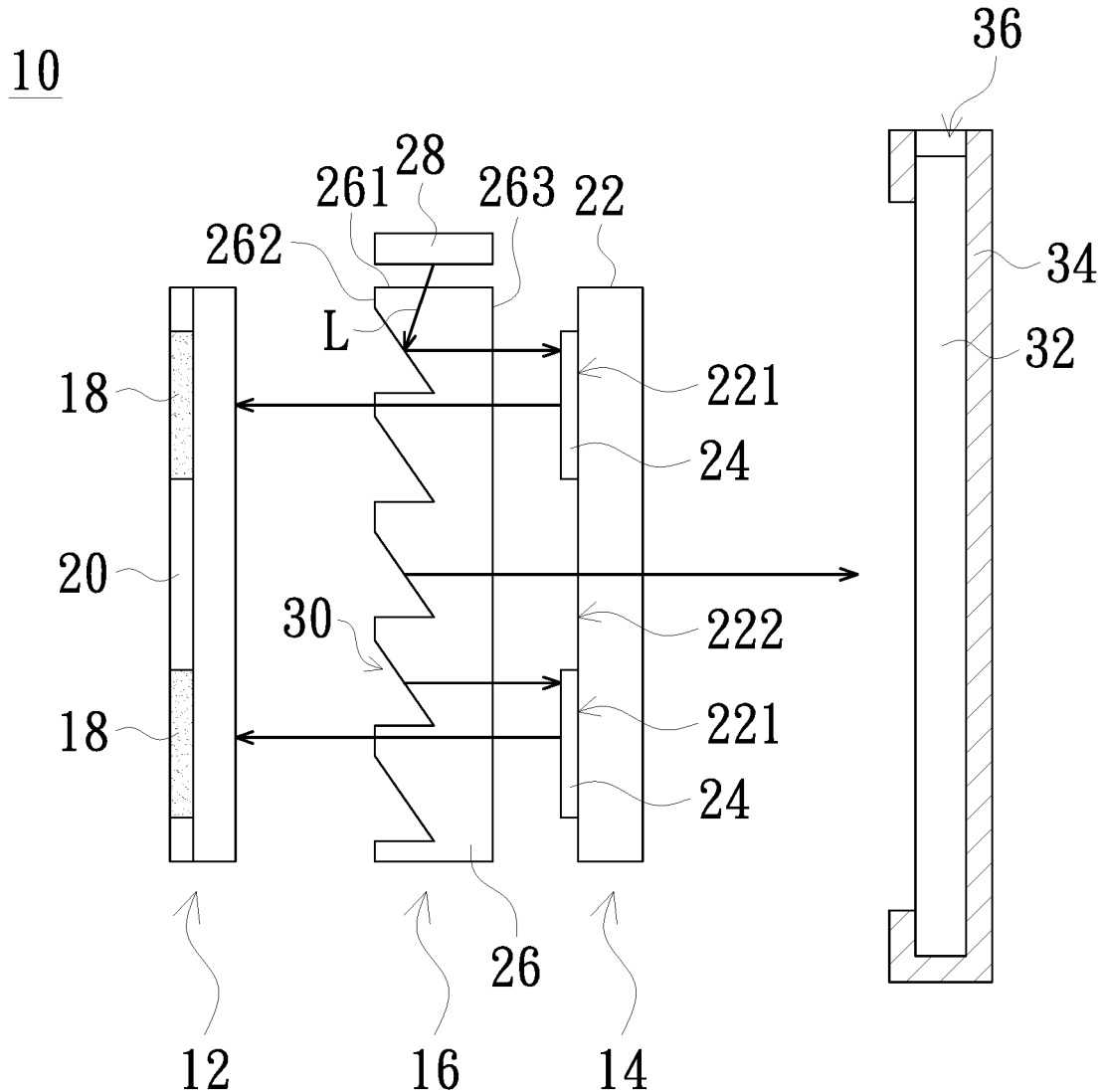
FIG. 1 is a schematic cross-sectional structural view of a display device according to an embodiment of the invention.

FIG. 1 is a schematic cross-sectional structural view of a display device according to an embodiment of the invention. As shown in the figure, a display device 10 includes a panel module 12, a reflection module 14 and a light guide module 16. The panel module 12 has at least one display area 18 and at least one perspective area 20. The display area 18 is for displaying an image. The perspective area 20 is for displaying a background. The reflection module 14 is disposed at one side of the panel module 12. The reflection module 14 includes a first transparent substrate 22 and at least one reflective sheet 24. A side of the first transparent substrate 22 facing the panel module 12 defines a reflective sheet disposition area 221 and a penetration area 222. The reflective sheet 24 is disposed in the reflective sheet disposition area 221 and faces the panel module 12. The shape and position of the reflective sheet 24 correspond to the shape and position of the display area 18, respectively. The penetration area 222 of the first transparent substrate 22 is an area not provided with the reflective sheet 24. In an embodiment, the penetration area 222 corresponds to the perspective area 20 of the panel module 12. The light guide module 16 includes a light guide plate 26 and at least one light source 28. The light guide plate 26 includes a light incident surface 261, a first surface 262 and a second surface 263. The first surface 262 and the second surface 263 are opposite, and the light incident surface 261 is connected to the first surface 262 and the second surface 263. The light guide module 16 is disposed between the panel module 12 and the reflection module 14. The first surface 262 faces the panel module 12. The second surface 263 faces the reflection module 14. The light source 28 is disposed beside the light incident surface 261. In the embodiment, it is taken as an example that the light guide module 16 includes a set of light sources 28 disposed beside the light incident surface 261 above the light guide plate 26, but is not limited thereto. In other embodiments, the light guide module 16 may include two sets of light sources disposed beside the light incident surfaces above and below the light guide plate 26, respectively, or include four sets of light sources disposed beside four light incident surfaces of the light guide plate 26, respectively. The light guide plate 26 has a plurality of optical microstructures 30. Through the optical microstructures 30, light L emitted by the light source 28 can be at least partially directed away from the panel module 12 and transmitted to the reflection module 14.

Figure 2A:
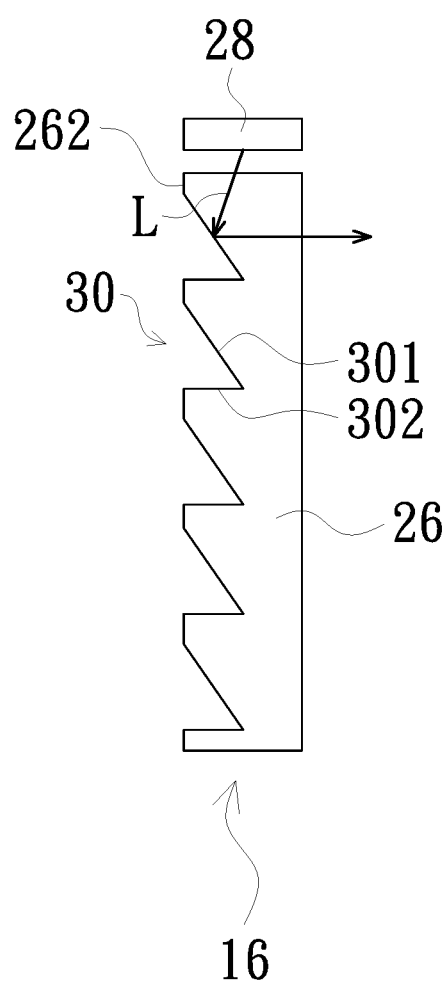
FIG. 2a and FIG. 2b are respectively schematic cross-sectional views of light guide plates having different optical microstructures and light sources according to an embodiment of the invention.
Figure 2B:
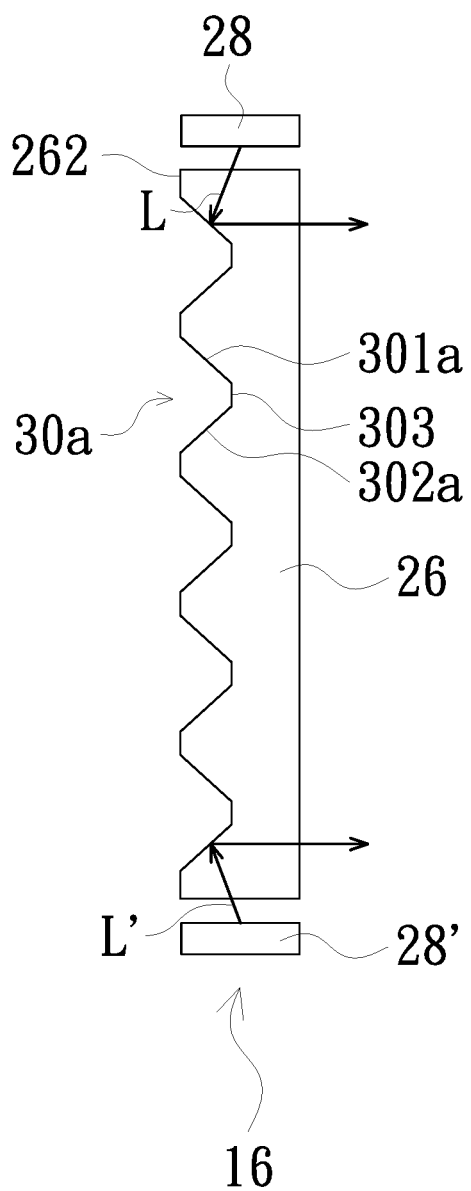

Following the above description, in the display device 10 of the embodiment, as shown in FIG. 1, the optical microstructures 30 are distributed all over the first surface 262 of the light guide plate 26. The optical microstructure 30 may be a raised structure that protrudes from the first surface 262, or a recessed structure that is recessed into the first surface 262. The light L emitted by the light source 28 is reflected by the optical microstructures 30 and is forwardly emitted from the second surface 263 and is transmitted to the reflection module 14 in a direction away from the panel module 12. FIG. 1 only schematically shows the travel of a portion of the light L. FIG. 2a and FIG. 2b are respectively schematic cross-sectional views of light guide plates having different optical microstructures 30, 30a and light sources according to an embodiment of the invention. As shown in FIG. 2a and FIG. 2b, it is taken as an example that the optical microstructures 30, 30a are recessed into the first surface 262, but not limited thereto.

In an embodiment, if the light guide module 16 has a set of light source 28 located at one side of the light guide plate 26, such as above the light guide plate 26, the optical microstructure 30, as shown in FIG. 2a, includes a first microsurface 301 and a second microsurface 302. The first microsurface 301 is tilted relative to the first surface 262, and the first microsurface 301 may be a flat surface or a curved surface. The second microsurface 302 is connected to adjacent two first microsurfaces 301. As a result, the light L from the light source 28, after being incident on the light guide plate 26, is directed away from the panel module 12 (shown in FIG. 1) through the first microsurface 301 and is transmitted to the reflection module 14 (shown in FIG. 1). FIG. 2a only schematically shows the travel of a portion of the light L.

In an embodiment, if the light guide module 16 has the light sources 28, 28' located at two opposite sides of the light guide plate 26 respectively, such as above and below the light guide plate 26, each of the optical microstructures 30a, as shown in FIG. 2b, includes a first microsurface 301a, a second microsurface 302a and a third microsurface 303. The first microsurface 301a faces one light source 28 and is tilted relative to the first surface 262. The second microsurface 302a faces the other light source 28' and is tilted relative to the first surface 262. The third microsurface 303 is connected to the first microsurface 301a and the second microsurface 302a, and the third microsurface 303 is substantially parallel to the first surface 262. The first microsurface 301a and the second microsurface 302a may be a flat surface or a curved surface. As a result, the light L from the light source 28 and the light L' from the light source 28', after being incident on the light guide plate 26, are directed away from the panel module 12 (shown in FIG. 1) by the first microsurface 301a and the second microsurface 302a respectively, and are transmitted to the reflection module 14 (shown in FIG. 1). FIG. 2b only schematically shows the travel of a portion of the light L and L'.

In the display device 10 of the embodiment, as shown in FIG. 1, the light L from the light source 28 is directed to the reflection module 14 by the optical microstructures 30 of the light guide plate 26. A portion of the light L directed to the reflection module 14 is reflected by the reflective sheet 24 on the reflective sheet disposition area 221 of the first transparent substrate 22 and is transmitted toward the panel module 12 to serve as a backlight source of a display image of the display area 18 of the panel module 12. Another portion of the light L directed to the reflection module 14 directly penetrates the penetration area 222 of the first transparent substrate 22. In an embodiment, as shown in FIG. 1, the display device 10 may further include an image module 32. The image module 32 is disposed at a side of the reflection module 14 away from the panel module 12. An image (not shown in the figure) displayed by the image module 32 serves as a background of the display device 10. The light L that directly penetrates the penetration area 222 of the first transparent substrate 22 irradiates the image module 32 to enhance the supplementary light of the image. When a viewer looks in front of the panel module 12, in addition to the image displayed by the display area 18, the image that is supplemented with light can be clearly seen through the perspective area 20. And the image displayed by the display area 18 is not on the same plane as the image serving as the background, thereby having a visual effect that the image of the display area 18 floats on an image. In addition, in an embodiment that does not include the image module 32, when the viewer looks in front of the panel module 12, in addition to the image displayed by the display area 18, the scene of the environment behind the reflection module 14 can be clearly seen through the perspective area 20.

In order to be able to replace the image module 32 at any time, as shown in FIG. 1, the display device 10 further includes a shell 34, for supporting the image module 32 and configuring the image displayed by the image module 32 to face the panel module 12. A side surface, such as the top, of the shell 34 has a slot 36. The slot 36 runs through the shell 34 and can be used to get the image module 32 into and out of the shell 34, so that the person who plays the image can self replace the image module 32 according to the needs.

Figure 3:
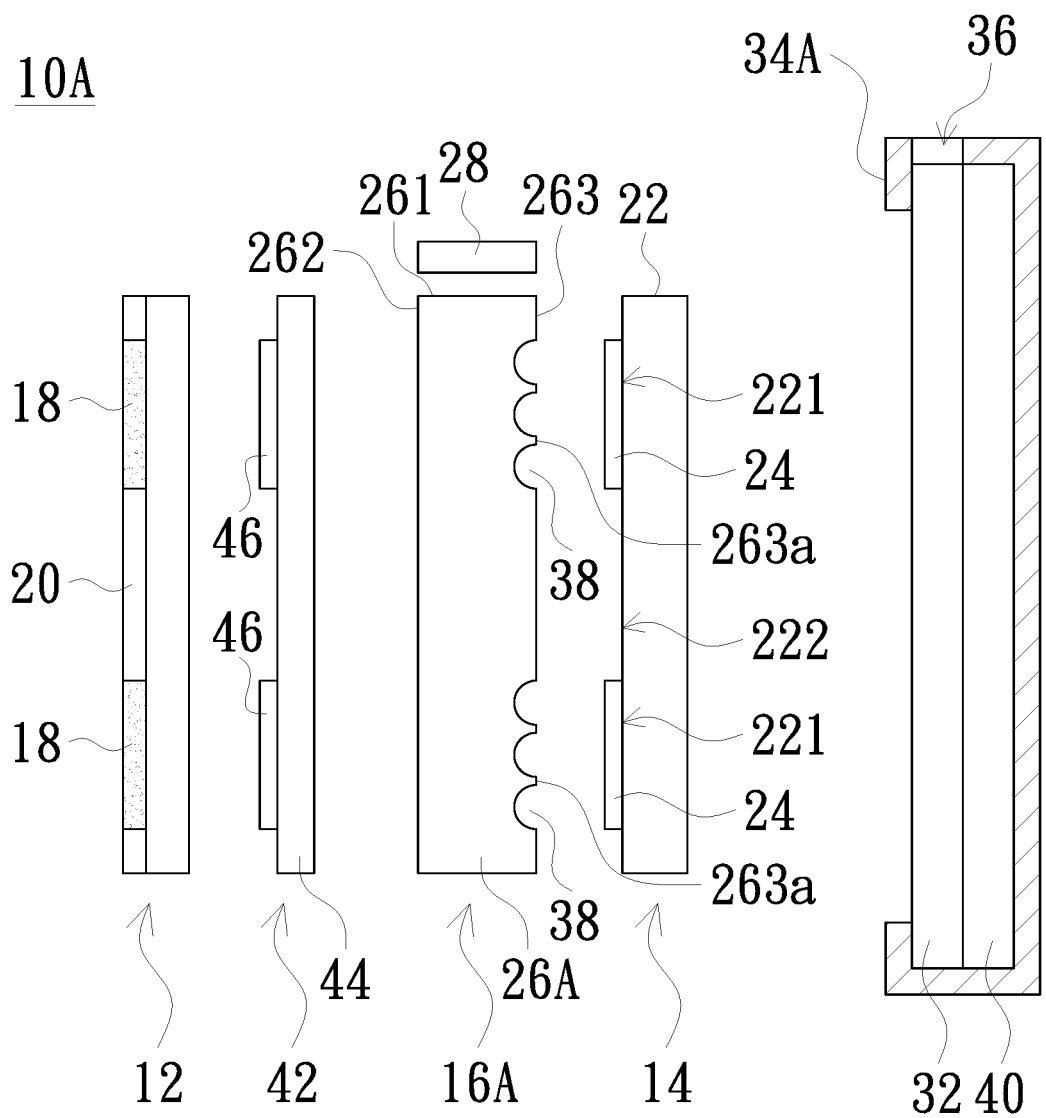
FIG. 3 is a schematic cross-sectional structural view of a display device according to another embodiment of the invention.

FIG. 3 is a schematic cross-sectional structural view of a display device according to another embodiment of the invention. As shown in the figure, a display device 10A includes a panel module 12, a reflection module 14 and a light guide module 16A. The difference between the embodiment and the embodiment of FIG. 1 mainly lies in the light guide module 16A. In the embodiment, the light guide module 16A includes a light guide plate 26A and at least one light source 28. The light guide plate 26A includes a light incident surface 261, a first surface 262 and a second surface 263. The first surface 262 is opposite to the second surface 263, and the light incident surface 261 is connected to the first surface 262 and the second surface 263. The light guide module 16A is disposed between the panel module 12 and the reflection module 14. The first surface 262 faces the panel module 12. The second surface 263 faces the reflection module 14. The light source 28 is disposed beside the light incident surface 261. The second surface 263 of the light guide plate 26A has at least one local distribution area 263a. The shape and position of the local distribution area 263a correspond to the shape and position of the reflective sheet 24, respectively. Further, the shape and position of the local distribution area 263a also correspond to the shape and position of the display area 18 of the panel module 12, respectively. Optical microstructures 38 are formed in the local distribution area 263a. In the display device 10A of the embodiment, the optical microstructures 38 are, for example, recessed microstructures recessed into the second surface 263, which are formed, for example, by injection molding or thermoforming, but not limited thereto. The optical microstructures 38 may also be, for example, protruded dot-like structures formed by screen printing or inkjet printing.

In the display device 10A of the embodiment, the display device 10A further includes an image module 32 and an auxiliary light source 40. The image module 32 is disposed at a side of the reflection module 14 away from the panel module 12. The image (not shown in the figure) displayed by the image module 32 serves as the background of the display device 10A. The auxiliary light source 40 is disposed at a side of the image module 32 away from the reflection module 14. That is, the image module 32 is disposed between the auxiliary light source 40 and the reflection module 14. In an embodiment, the auxiliary light source 40 may be a light box, in which the light source is covered by a wrap-around casing, and the wall of the casing may further be provided with a reflective material to reflect and concentrate the light of the light source, but not limited thereto. In other embodiments, as shown in FIG. 4, the auxiliary light source 40 is disposed between the image module 32 and the reflection module 14.

Following the above description, a portion of the light (not shown in the figure) from the light source 28 of the light guide module 16A is scattered by the optical microstructures 38 of the light guide plate 26A to the reflective sheet 24 corresponding to the local distribution area 263a, and then is reflected by the reflective sheet 24 and is transmitted toward the panel module 12 to serve as the backlight source of the display image of the display area 18 of the panel module 12. Meanwhile, the image displayed by the image module 32 is supplemented with light by the auxiliary light source 40, so that the viewer can clearly see the image supplemented with light in the perspective area 20 of the panel module 12. When the viewer looks in front of the panel module 12, the image displayed by the display area 18 is not on the same plane as the image serving as the background, and thus there is a visual effect that the image of the display area 18 floats on an image.

Figure 4:
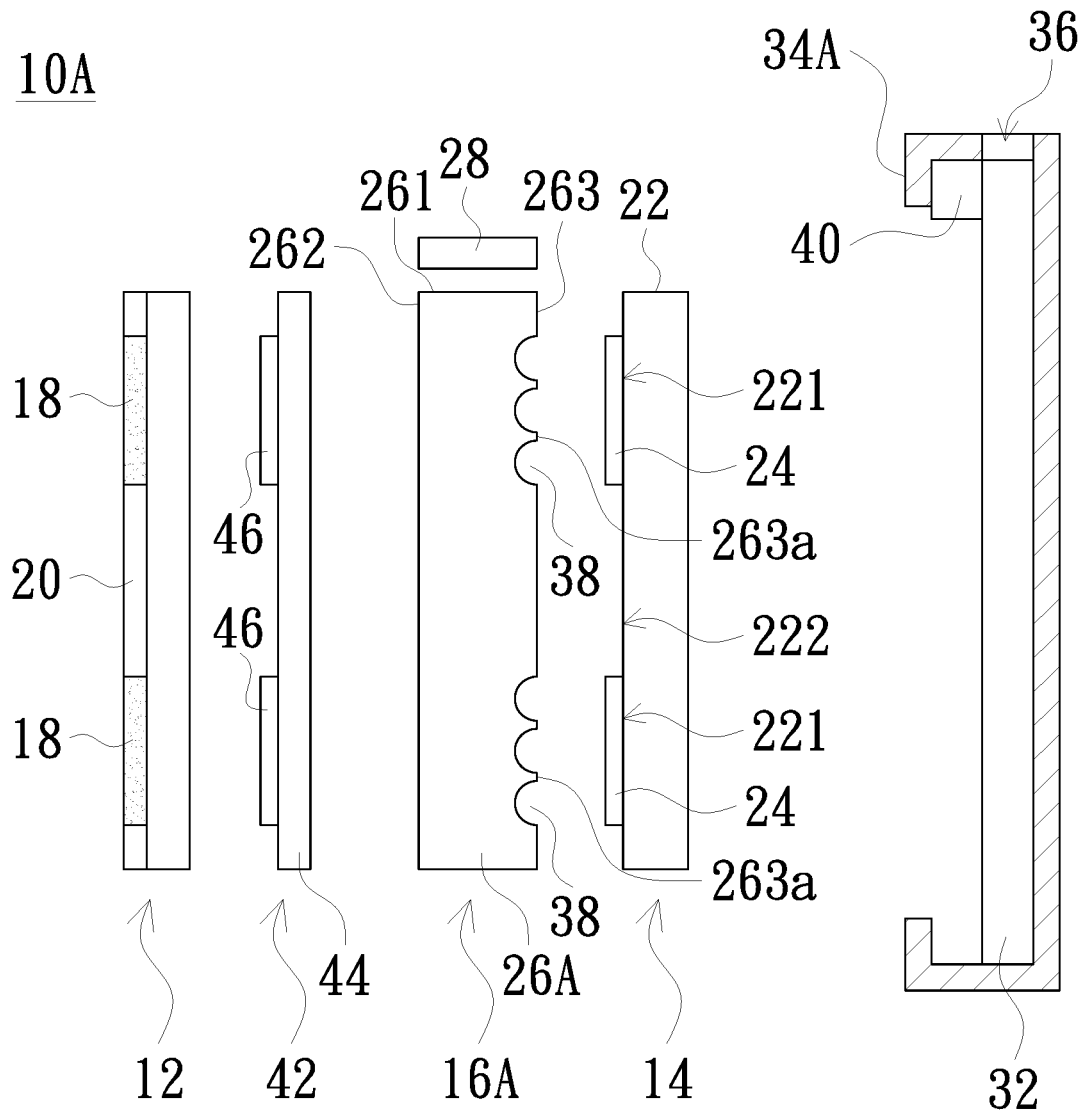
FIG. 4 is a schematic cross-sectional structural view of a display device according to still another embodiment of the invention.

As shown in FIG. 3 and FIG. 4, in order to be able to replace the image module 32 at any time, the display device 10A further includes a shell 34A, for supporting the image module 32 and the auxiliary light source 40, and configuring the image displayed by the image module 32 to face the panel module 12. A side surface, such as the top, of the shell 34A has a slot 36. The slot 36 runs through the shell 34A and can be used to get the image module 32 and/or the auxiliary light source 40 into and out of the shell 34A, so that the person who plays the image can self replace the image module 32 according to the needs.

In the display device 10 of the embodiment of FIG. 1 and the display device 10A of the embodiments of FIG. 3 and FIG. 4, the material of the image module 32 may be a sheet of paper, a slide or a sheet of celluloid, on which there are static images such as pictures and photos to serve as the backgrounds of the display devices 10 and 10A. Or in an embodiment, the image module 32 is a module that can display a dynamic image, so as to display dynamic images as the backgrounds of the display devices 10, 10A.

Please continue to refer to FIG. 3 and FIG. 4. The display device 10A may further include an optical film assembly 42. The optical film assembly 42 includes a second transparent substrate 44 and optical films 46 disposed at one side or two opposite sides of the second transparent substrate 44. The optical film assembly 42 is disposed between the panel module 12 and the light guide plate 26A, and the shape and position of the optical film 46 correspond to the shape and position of the display area 18 of the panel module 12, respectively. That is, the shape and position of the optical film 46 also correspond to the shape and position of the reflective sheet 24 respectively, and correspond to the shape and position of the local distribution area 263a of the light guide plate 26A. The optical film 46 includes one of a brightness enhancement film and a diffusion film or a combination thereof, so as to increase the brightness and uniformity and the like of the image displayed by the display area 18.

Figure 5:
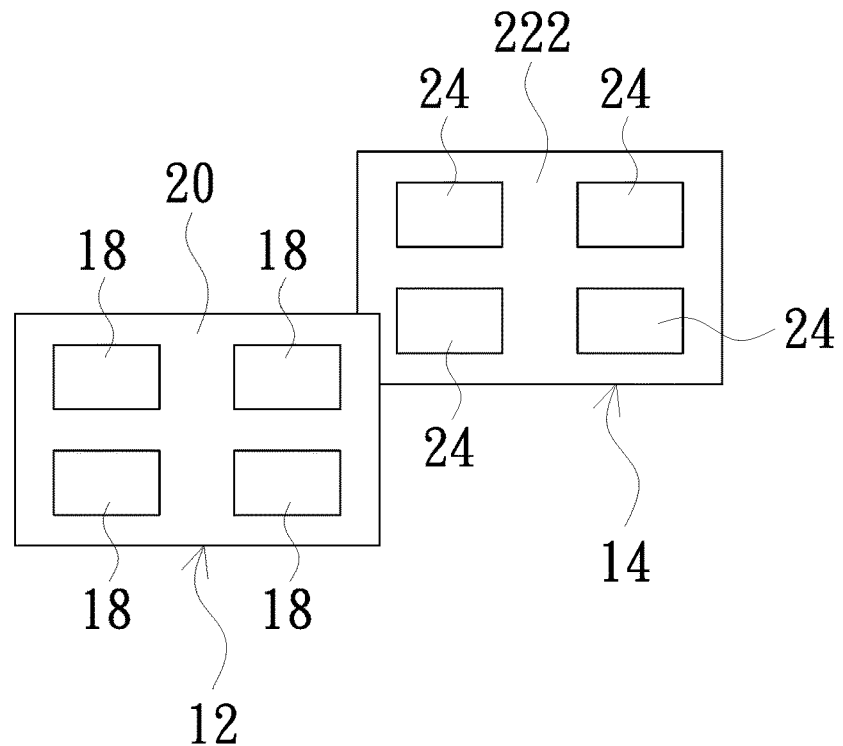
FIG. 5 is a schematic view showing a display of a panel module and a corresponding reflection module thereof according to an embodiment of the invention.

FIG. 5 is a schematic view showing a display of a panel module and a corresponding reflection module thereof according to an embodiment of the invention. As shown in FIG. 5, the panel module 12 includes four display areas 18. The area other than the four display areas 18 serves as the perspective area 20. In the embodiment, the shape of the display area 18 is a rectangle, but is not limited thereto. The display area 18 may be of a special shape such as a circle, a square or an irregular shape to display an image. Corresponding to the four display areas 18, the reflection module 14 includes four reflective sheets 24, of which the shape, size and positional relationship correspond to those of the four display areas 18, respectively.

The person who plays the images of the display devices 10, 10A may design an image template corresponding to the display areas 18 in advance. The images are played, for example, in the four display areas 18 at the same time through the control of applying voltage or not. The images are, for example, videos or photos. Since the display area 18 has the light reflected by the corresponding reflective sheet 24 as a backlight source, the videos and the photos can be clearly played. In an embodiment, through the control of applying voltage or not, the perspective area 20 of the panel module 12 is configured to not have an image display and the light is allowed to pass therethrough, so that the image of the image module 32 (shown in FIG. 1, FIG. 3 or FIG. 4) that is supplemented with light can be directly viewed. Alternatively, in the embodiment of the display device 10, the scene of the environment behind the reflection module 14 can be directly viewed.

Figure 6:
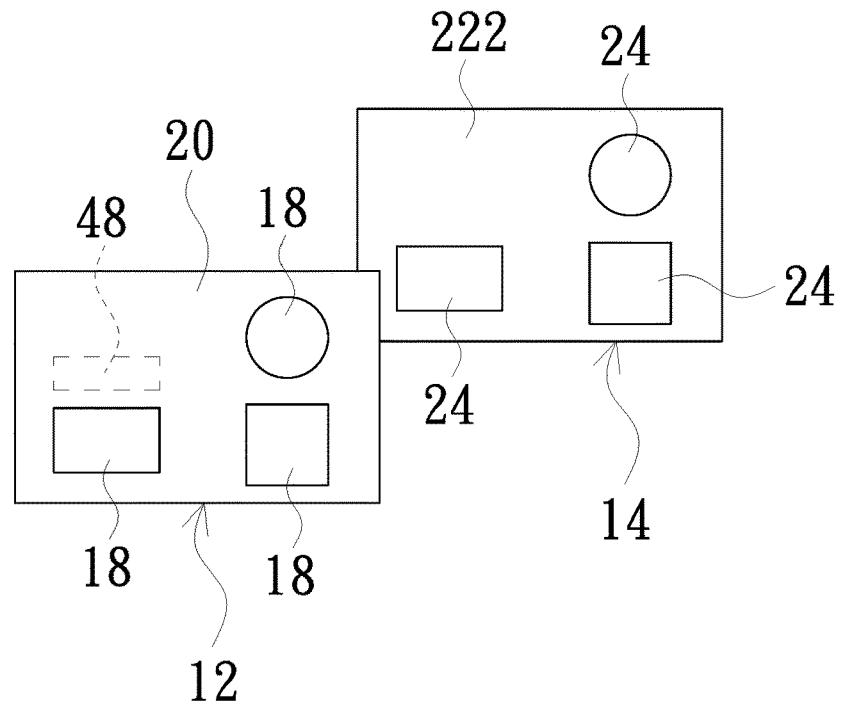
FIG. 6 is a schematic view showing a display of a panel module and a corresponding reflection module thereof according to still another embodiment of the invention.

FIG. 6 is a schematic view showing a display of a panel module and a corresponding reflection module thereof according to still another embodiment of the invention. As shown in FIG. 6, in addition to three display areas 18 and a perspective area 20, the panel module 12 further includes a semi-perspective area 48. In an embodiment, the display area 18, the perspective area 20 and the semi-perspective area 48 do not overlap. Corresponding to the three display areas 18, the reflection module 14 includes three reflective sheets 24, of which the shape, size and position correspond to those of the three display areas 18, respectively. The perspective area 20 and the semi-perspective area 48 of the panel module 12 both correspond to the penetration area 222 of the reflection module 14 not provided with the reflective sheet 24.

Following the above description, since the semi-perspective area 48 is not correspondingly provided with the reflective sheet 24, when the panel module 12 displays the image in the semi-perspective area 48, the viewer can also see, at the same time, the image or the environmental scene of the image module 32 at the rear. The image displayed by the semi-perspective area 48 is, for example, a text or a trademark or other patterns. This image overlaps with the image or the environmental scene serving as the background. Although the display is less clear, there is a semi-perspective effect.

In the display device 10 of the embodiment of FIG. 1, the person who plays the image may design an image template according to the needs, so as to have the display areas 18 of a plurality of shapes and different positions. If the user replaces the image template, only the reflection module 14 needs to be replaced such that the shape and position of the reflective sheet 24 correspond to those of the display area 18, and thereby a plurality of display effects can be made.

In the display device 10A of the embodiments of FIG. 3 and FIG. 4, if the person who plays the image replaces different image templates according to the needs, the light guide plate 26A, the reflection module 14 and the optical film assembly 42 must be replaced together, such that the shape and position of the local distribution area 263a of the light guide plate 26A correspond to those of the display area 18, and the shape and position of the reflective sheet 24 of the reflection module 14 also correspond to those of the display area 18, and the shape and position of the optical film 46 of the optical film assembly 42 also correspond to those of the display area 18.

Figure 7:
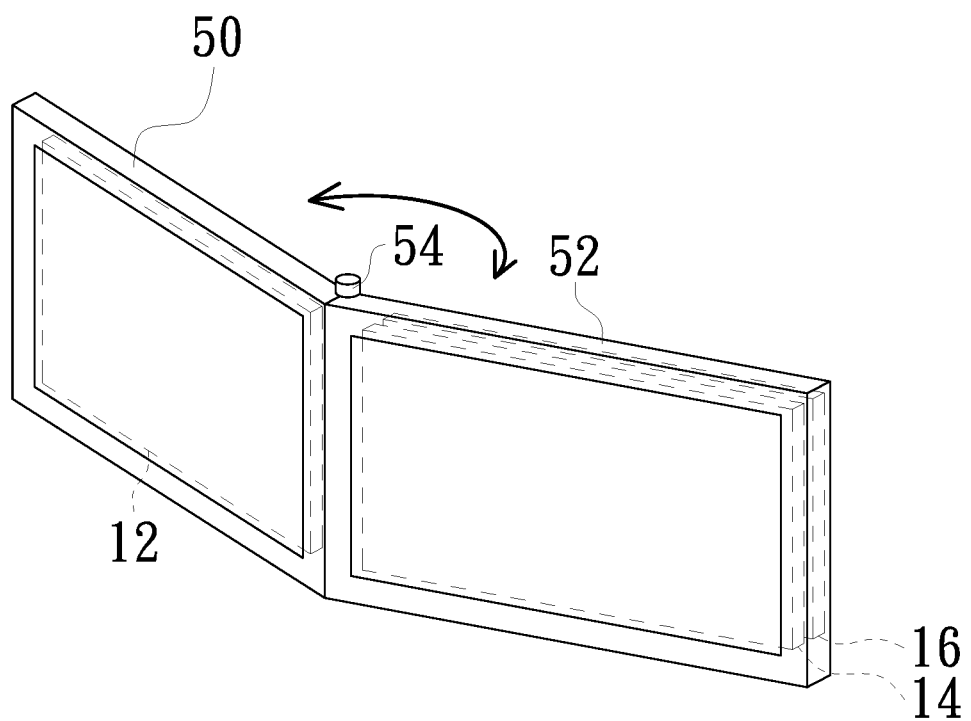
FIG. 7 is a schematic view showing the assembly of a panel module, a light guide module, and a reflection module according to an embodiment of the invention.

On the other hand, in order to match the display area 18 of the panel module 12 to replace the reflection module 14, or to replace the reflection module 14, the light guide plate 26A and the optical film assembly 42 together, the display devices 10, 10A may further include a shell (not shown in the figure) having an opening. The shell can support the reflection module 14, the light guide modules 16, 16A and the optical film assembly 42. The reflection module 14, the light guide plate 26A and the optical film assembly 42 can be replaced by entering and exiting the display device 10 or 10A through the opening, thereby achieving the function of changing display effects according to the demand. Further, FIG. 7 is a schematic view showing the assembly of a panel module, a light guide module, and a reflection module according to an embodiment of the invention. As shown in FIG. 7, the display devices 10, 10A may further include a front frame 50, a rear frame 52 and a door shaft assembly 54. The door shaft assembly 54 is pivotally connected between the front frame 50 and the rear frame 52. As shown in FIG. 7, the front frame 50 is used for supporting the panel module 12. The rear frame 52 is used for supporting the reflection module 14, the light guide modules 16, 16A (indicated by the light guide module 16 in FIG. 7) and the optical film assembly 42 (not shown in the figure). Through the door shaft assembly 54, the front frame 50 together with the panel module 12 can be deflected toward a direction away from the rear frame 52 with the door shaft assembly 54 as a fulcrum. In an embodiment, when the front frame 50 together with the panel module 12 is deflected toward a direction away from the rear frame 52, the display devices 10, 10A are in an open state. At this time, the display area 18 of the panel module 12 can be matched to replace the reflection module 14 (such as when the display device 10 of the embodiment of FIG. 1 is applied), or to replace, at the same time, the reflection module 14, the light guide plate 26A and the optical film assembly 42 (such as when the display device 10A of the embodiments of FIG. 3 and FIG. 4 is applied). When the replacement of the reflection module 14, the light guide plate 26A and the optical film assembly 42 is completed, such that the shape and position of the reflective sheet 24 and/or the local distribution area 263a and/or the optical film 46 correspond to the shape and position of the display area 18 of the panel module 12 respectively, the front frame 50 together with the panel module 12 is deflected toward a direction close to the rear frame 52 with the door shaft assembly 54 as a fulcrum, so that the front frame 50 and the rear frame 52 are combined together, and thus the assembly of the panel module 12, the light guide module 16 or 16A (indicated by the light guide module 16 in FIG. 7), the reflection module 14 and the optical film assembly 42 (not shown in the figure) is completed, thereby achieving the function of changing display effects according to the needs.

In the display device 10 or 10A of the embodiments of the invention, the reflective sheet 24 of the reflection module 14 has a function of diffuse reflection, usually by using a white reflective sheet, and being fixed on the first transparent substrate 22 by means of pasting or the like. Corresponding to the shape of the display area 18 of the panel module 12, the reflective sheet 24 may be circular, square or irregular in shape. The reflective sheet 24 can not only reflect the light from the light guide plate 26 or 26A to serve as the backlight source of the display area 18, but also have a function of shielding a portion of the image of the image module 32, so that the image displayed by the display area 18 is not affected by the image as the background or the rear environmental scene.

In summary, the invention can achieve the following effects:

(1) The display device of the embodiment can achieve the visual effect that the image of the display area floats on the background image through the panel module, the light source, the light guide plate and the reflection module. And the display device of the embodiment has the advantage of low cost.

(2) The reflective sheet of the reflection module of the display device of the embodiment may be in a variety of shapes, even including special shapes such as irregular shapes. Therefore, the display device of the embodiment has better practicability and can achieve a plurality of display effects according to the needs.

(3) In the display device of the embodiment, the person who plays the image can make a plurality of display effects according to the demand by just replacing the reflection module or replacing the reflection module and the light guide plate without the need to re-open a mold as a whole or to additionally order samples. In addition, based on the choice of the light guide plate, the display device can achieve the display requirements without the addition of the auxiliary light source. There are advantages of small size and being ready to be replaced at any time.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first transparent substrate, the second transparent substrate, the first surface, the second surface, the first microsurface, the second microsurface and the third microsurface are only used for distinguishing various elements and do not limit the number of the elements.

What is claimed is:

1. A display device, comprising:
a panel module, having at least one display area and at least one perspective area, wherein the at least one display area is used for displaying an image, and the at least one perspective area is used for displaying a background;
a reflection module, comprising a first transparent substrate and at least one reflective sheet disposed at the first transparent substrate, wherein the reflection module is disposed at a side of the panel module, the at least one reflective sheet faces the panel module, a shape and position of the at least one reflective sheet correspond to a shape and position of the at least one display area respectively, and the at least one perspective area corresponds to an area other than the at least one reflective sheet in the reflection module; and a light guide module, comprising a light guide plate and at least one light source, wherein the light guide module is disposed between the panel module and the reflection module, the light guide plate comprises at least one light incident surface, a first surface and a second surface, the first surface is opposite to the second surface, the at least one light incident surface is connected to the first surface and the second surface, the first surface faces the panel module, the second surface faces the reflection module, the at least one light source is disposed beside the at least one light incident surface respectively, the light guide plate has a plurality of optical microstructures, and light emitted by the at least one light source is at least partially directed away from the panel module by the plurality of optical microstructures and is transmitted to the reflection module.

2. The display device according to claim 1, further comprising an image module disposed at a side of the reflection module away from the panel module, wherein an image displayed by the image module serves as the background.

3. The display device according to claim 2, further comprising a shell, wherein the shell supports the image module, the shell has a slot, and the slot runs through the shell and is used for getting the image module into and out of the shell.

4. The display device according to claim 1, wherein the plurality of optical microstructures are formed at the first surface of the light guide plate.

5. The display device according to claim 4, wherein the plurality of optical microstructures comprise a raised structure protruding from the light guide plate.

6. The display device according to claim 4, wherein the plurality of optical microstructures comprise a recessed structure recessed into the light guide plate.

7. The display device according to claim 4, wherein each of the plurality of optical microstructures at least comprises a first microsurface, the first microsurface faces at least one of the at least one light source and is tilted relative to the first surface, and the first microsurface is a flat surface or a curved surface.

8. The display device according to claim 4, wherein each of the plurality of optical microstructures at least comprises a first microsurface, a second microsurface and a third microsurface, the first microsurface faces one of the at least one light source, the second microsurface faces another one of the at least one light source, the first microsurface and the second microsurface are tilted relative to the first surface, the third microsurface is connected to the first microsurface and the second microsurface, the third microsurface is substantially parallel to the first surface, and the first microsurface and the second microsurface are flat surfaces or curved surfaces.

9. The display device according to claim 4, wherein the plurality of optical microstructures are formed at the entire first surface, and the light emitted by the at least one light source is reflected by the plurality of optical microstructures and is forwardly emitted from the second surface and is transmitted to the reflection module in a direction away from the panel module.

10. The display device according to claim 1, wherein the second surface of the light guide plate has at least one local distribution area, a shape and position of the at least one local distribution area correspond to a shape and position of the at least one reflective sheet of the reflection module respectively, and the plurality of optical microstructures are formed in the at least one local distribution area.

11. The display device according to claim 10, wherein a portion of the light emitted by the at least one light source is scattered by the plurality of optical microstructures to the at least one reflective sheet corresponding to the at least one local distribution area.

12. The display device according to claim 10, further comprising an image module and at least one auxiliary light source, wherein the image module is disposed at a side of the reflection module away from the panel module, the auxiliary light source is disposed between the image module and the reflection module, or the image module is disposed between the auxiliary light source and the reflection module, and an image displayed by the image module serves as the background.

13. The display device according to claim 12, further comprising a shell, wherein the shell supports the image module and the at least one auxiliary light source, the shell has a slot, and the slot runs through the shell and is used for getting the image module into and out of the shell.

14. The display device according to claim 10, further comprising at least one optical film assembly, wherein the optical film assembly comprises a second transparent substrate and at least one optical film disposed at the second transparent substrate, the optical film assembly is disposed between the panel module and the light guide plate, and a shape and position of the at least one optical film correspond to a shape and position of the at least one display area, respectively.

15. The display device according to claim 14, wherein the optical film comprises a brightness enhancement film or a diffusion film or a combination thereof.

16. The display device according to claim 1, wherein the panel module further comprises at least one semi-perspective area, the at least one semi-perspective area is used for displaying an image and a background at the same time, and the at least one semi-perspective area corresponds to an area other than the at least one reflective sheet in the reflection module.

17. The display device according to claim 1, further comprising a shell, wherein the shell supports the reflection module and the light guide module, the shell has an opening, and the opening is used for matching the at least one display area of the panel module to replace the reflection module or the light guide plate.

18. The display device according to claim 1, further comprising a front frame, a rear frame and a door shaft assembly, wherein the front frame supports the panel module, the rear frame supports the reflection module and the light guide module, the door shaft assembly is pivotally connected between the front frame and the rear frame, and the door shaft assembly is used for configuring the front frame to drive the panel module to rotate toward a direction away from the rear frame, so as to match the at least one display area of the panel module to replace the reflection module or the light guide plate.

* * * * *